INVENTOR.
MARVIN SCHNEIDER
BY
James and Franklin
ATTORNEY

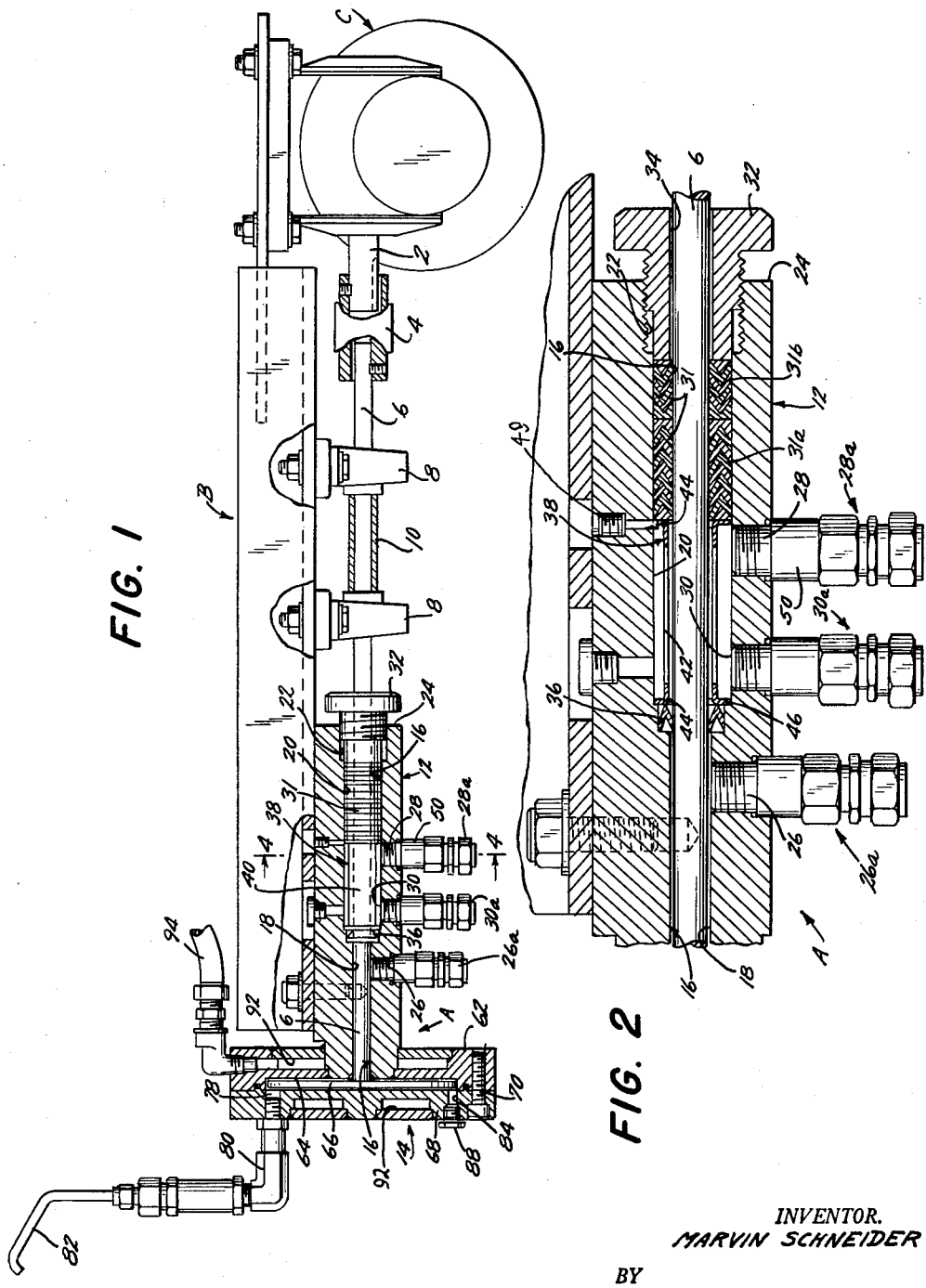
March 7, 1961 — M. SCHNEIDER — 2,973,945
MIXING DEVICE
Filed Oct. 22, 1958 — 2 Sheets-Sheet 1
INVENTOR.
MARVIN SCHNEIDER
BY
ATTORNEY March 7, 1961  M. SCHNEIDER  2,973,945
MIXING DEVICE Filed Oct. 22, 1958  2 Sheets-Sheet 2

United States Patent Office 2,973,945
Patented Mar. 7, 1961

2,973,945
MIXING DEVICE

Marvin Schneider, Wyncote, Pa., assignor to Novo Industrial Corporation, a corporation of New York Filed Oct. 22, 1958, Ser. No. 768,981

16 Claims. (Cl. 259—9)

The present invention relates to a mixing device, and in particular to one specially adapted for working with substances which, when combined, produce a mixture having a tendency to set to a hard condition in a relatively short period of time.

Reactive resin mixes are being used to an ever increasing degree. Such mixes usually comprise a synthetic resin such as an epoxy resin and a hardener therefor. The resin and the hardener individually can be permitted to stand for relatively long periods of time, and in many cases substantially indefinitely, without any change in their characteristics. However, when the two substances are mixed they react to produce a mixture which, whether agitated or permitted to stand, will cure or set to a hard and tough condition in a short period of time, often within a matter of minutes. The set resin mixtures are widely used for the formation of molded products and for the encapsulation or "potting" of items such as electrical components, in order to protect the latter against adverse atmospheric conditions. Other applications, not always involving the use of reactive mixes but always involving the careful proportioning of the substances being mixed, are in the application of adhesive layers and other surface coatings and in the formulation of polyurethane foams. The characteristics of the cured or set resin mixtures are to a large extent controlled by the proportions of the components thereof and by the homogeneity of the mixture. However, because of the short "pot life" which these reactive mixtures exhibit (which is but another way of saying that they tend to set to a hard and tough condition within a short period of time), and because of the comparatively critical effect of their homogeneity and the relative proportions of their components on the properties of the end product, considerable difficulty has been experienced in handling these mixtures on a production scale.

Many of these difficulties have been overcome or brought within reasonable limits through the use of automatic proportional metering, mixing and dispensing systems of the type disclosed in my Patent 2,788,953 of April 16, 1957. In such systems each of the components making up the resin mixture is fed through an individual feed system, the two systems being interrelated so as to provide for closely controlled relative proportioning of the components, to a mixer where the components are mixed and from which the components are dispensed. Automatic means may be provided for ensuring that, when the resin mixture in the mixer approaches the end of its pot life (when it is ready to set) appropriate action is taken to ensure that the mixture is regenerated insofar as its pot life is concerned.

Even with such automatic means accidents may occur the consequences of which are most serious. Without such automatic means a lapse on the part of the often all-too-human attendant will have equally serious results. If the resin mixture should set in the mixer, for whatever reason, it is an exceedingly difficult task, and sometimes a well nigh impossible task, to remove the set material and recondition the mixer for further use.

It has been found, in the course of development and refinement of systems adapted for handling these reactive resin mixes, that it is often advantageous to utilize a mixer having a small volumetric capacity relative to the volumes of the mixed components fed to the mixer on each cycle of operation of the individual feed systems. Such mixers will act upon relatively thin films of the two components and consequently will achieve a better mix, the end result being products of greater homogeneity and excellence. Moreover, since these reactive mixes are often thixotropic (their viscosity decreases as they are increasingly agitated), keeping the mixes in the form of thin films in the mixer, and thus keeping all of the mix constantly in a state of extreme agitation, permits the mixer to handle materials of greatly increased viscosity than would otherwise be possible.

However, this development of small volume mixers has not eliminated the danger that the material in the mixer might exceed its pot life and set. Mixers, of whatever volume, must be constructed so that if this unwanted eventuality should occur the set resin mixture can readily be removed therefrom. It will be appreciated that this is a very critical problem in the production use of systems handling reactive resin mixes, since for so long as the mixer is out of commission the entire system associated therewith must remain idle.

In mixers of any type the construction must be such that the reactive resin mix can be purged from the mixer whenever desired, as when operation of the system is interrupted for any appreciable period of time, e.g. overnight, and that the purging medium can be expelled from the mixer when the system is to resume operation.

Since mixing involves agitation the interior of the mixer must contain an enclosed agitating member. Motive force is provided by a shaft which extends out from the mixer and is connected to a source of power such as a motor. The shaft must be sealed, to prevent resin from leaking out from the mixer, and also preferably to prevent air from entering the mixer when the resin mix is to be fed to a vacuum mold. If the seal becomes contaminated with reactive resin mix the mix will set and the seal will be destroyed. Moreover, the mix will tend to lock the seal to the shaft, thus making the disassembly and cleaning of the mixer exceedingly difficult if not impossible.

Another source of trouble in mixers used for the purposes above described is the accumulation of mixed resin and hardener at particular locations within the mixer. If any such accumulation occurs the mix will set and interfere with proper operation of the mixer.

For all of the above reasons it is of particular importance that the mixer be designed in such a way as to provide for controlled flow through the mixer from inlet to exit of the resin and hardener components, that the mixture of those components, which mixture alone is reactive, be kept away from the more or less delicate portions of the mixer, e.g. the shaft seal, that purging material can be fed into the mixers so as to substantially completely remove all of the reactive mix therefrom, that subsequent operation of the mixer with resin and hardener shall completely remove all of the purging medium, and that no spaces be provided within which reactive mix can accumulate. It is moreover desirable that this be done in such a way as not to detract from the mixing function of the device, and preferably so as to facilitate that mixing function.

Many of the problems involved are not necessarily peculiar to the use of reactive mixes. For example, if one of the mixed components is of a type which would attack the sealing rings through which the mixer shaft passes, or if one of the components should carry a substance (e.g., an abrasive filler) which might attack those rings, control of the flow of the substances through the mixer in order to insulate the sensitive parts from the dangerous components is also necessary.

The mixer of the present design is so constructed as to achieve all of these results through proper structural design by means of which the flow of resin, hardener and purging medium through the mixer is carefully controlled, and in particular so that the resin and hardener are mixed only in an area removed and insulated from the shaft seal and where effective mixing is immediately initiated. To this end the mixer is provided with an elongated passage one end of which is closed, as by the shaft seal, and the other end of which leads to the exit port of the mixer. The resin and hardener are fed into this passage through inlet ports spaced therealong, a first of those ports being more remote from the closed passage end than the second. Consequently the space in the passage from the closed passage end to the first port will be filled only with one of the mix components, which component in and of itself is not reactive and which therefore will not adversely affect the shaft seal or other means employed to close the passage end. The two components will meet one another to produce a reactive mix only at a point well spaced from the closed passage end, to wit, at the first port.

The mixer may be provided with a third inlet port for the purging medium, that inlet being located between the inlet ports for the two mix components. Hence the purging medium, in moving from its inlet port to the mixer outlet port, will completely wash the reactive mix from the mixer. As an additional safety feature, one-way valve means may be interposed in the passage between the inlet ports for the two mix components, that valve means permitting flow toward the mixer outlet port and restricting flow in the opposite direction. This one-way valve means may take the form of a V ring urged into engagement with the inner surface of the passage and with the agitator shaft, the apex of that V ring being disposed toward the closed passage end, means being provided engageable with the apex of the V ring to urge it away from the closed passage end and hence into valving engagement with the shaft and inner surface of the passage. The various inlet ports are provided with poppet valves permitting flow of material only into the mixer, the tops of those valves being located substantially flush with the inner surface of the mixer passage so as to minimize or prevent the accumulation of stagnant material in that passage. The mixer itself is provided with a drain plug to permit the draining of any long term accumulations of resin, the threads of that plug being prevented from attack by reactive mixture by interposing a sealing ring between those threads and the interior of the mixer chamber.

As a result a mixer is produced which is capable of handling materials of relatively high viscosity, of uniformly mixing such materials, and of handling materials which, when mixed, are highly reactive and have an exceptionally short pot life. The structure is relatively simple, need not be manufactured to exceptionally rigid tolerance requirements, may readily be disassembled for cleaning or replacement of parts, and in which, if the reactive mix should set, cleaning and reconditioning can be carried out in a normal period of time.

To the accomplishment of the above, and to such other objects as may hereinafter appear, the present invention relates to the mixer structure as defined in the appended claims, and as described in this specification, taken together with the accompanying drawings, in which:

Fig. 1 is a side elevational view, partially broken away and cross sectioned, of the mixer of the present invention;

Fig. 2 is a fragmentary view, on an enlarged scale, of that portion of the mixer where the various inlet ports are located;

Figure 3:
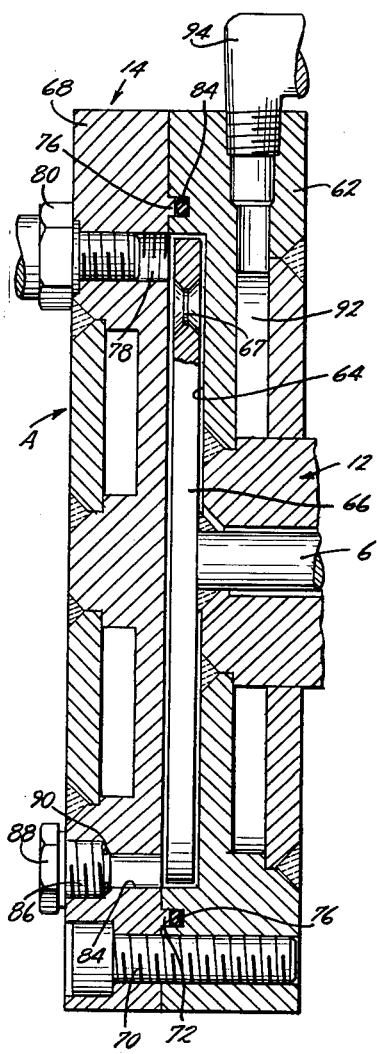
Fig. 3 is a side cross sectional view, on an enlarged scale, of that portion of the mixer comprising the mixer chamber proper.
Figure 4:
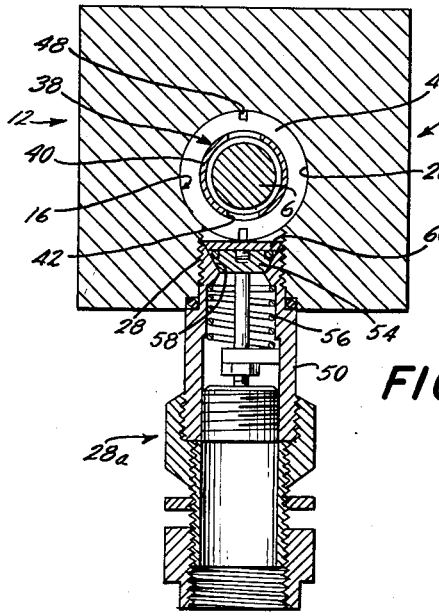
Fig. 4 is a cross sectional view taken along the line 4—4 of Fig. 1.
Figure 5:
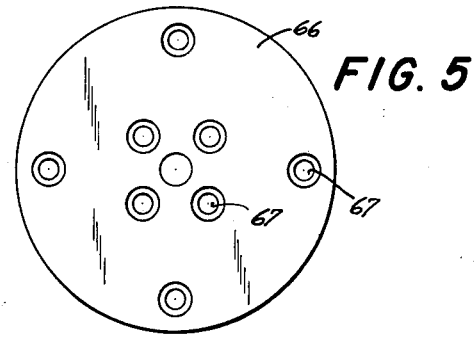
Fig. 5 is an end elevational view of the agitator disk.

As here specifically disclosed, the mixer, generally designated A, is mounted on bracket B and is adapted to be driven by motor C also mounted on the bracket B. The motor C may comprise an electric motor and reduction gear combination having output shaft 2 connected, by means of flexible coupling 4, to mixer shaft 6, the latter being journaled in pillow blocks 8, spacer sleeve 10 extending around the shaft 6 between the blocks 8.

The mixer itself comprises a casing having an elongated portion generally designated 12 and a mixing head generally designated 14. The elongated body 12 is provided with an axial passage generally designated 16 through which the agitator shaft 6 extends. Reading from left to right, the passage 16 comprises a narrow portion 18 only slightly larger than the shaft 6, a clearance on the order of .020–.035 inch being provided, a wider passage portion 20 and a still wider and internally threaded passage portion 22 opening onto the end 24 of the elongated body 12. A first inlet port 26 communicates between the exterior of the body 12 and the interior of the narrow passage portion 18, and second and third inlet ports 28 and 30 respectively communicate between the exterior of the body 12 and the interior of the wider passage portion 20. Also located in the wider passage portion 20, and to the right of the second inlet port 28, are a plurality of sealing rings 31 backed up by a pressure nut 32 threadedly received in the widest passage portion 22 and provided with an axial aperture 34 through which the shaft 6 freely passes. The sealing rings 31 may comprise a first group 31a oriented to prevent flow out from the passage portion 20 and a second portion 31b oppositely oriented to prevent fluid flow into the passage portion 20. The inner (left hand) end of the sealing rings 31 is, as may best be seen from Fig. 2, quite closely adjacent the second inlet port 28.

Figure 6:
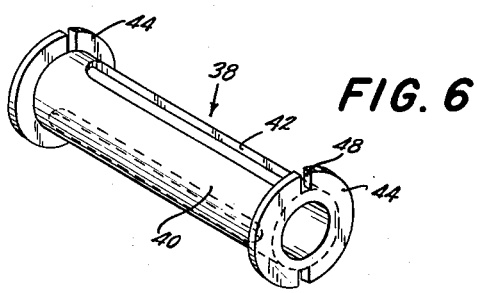
Fig. 6 is a three-quarter perspective view of the separator member located adjacent certain of the inlet ports.

Mounted at the left hand end of the wider passage portion 20, and between the first and third inlet ports 26 and 30 respectively, is a V-shaped sealing ring 36 the apex of which is directed toward the sealing rings 31 and the ends of which sealingly engage the shaft 6 and the inner surface of the wider passage portion 20 respectively. Disposed between the apex of the V ring 36 and the sealing rings 31 is a separator member 38 (best shown in Fig. 6) which comprises an elongated substantially cylindrical wall 40 having a pair of diametrically opposed elongated apertures 42 therein, outwardly extending flanges 44 being provided at each end of the wall 40. As may best be seen from Fig. 2, the length of the separator member 38 fills the gap between the apex of the V ring 36 and the sealing rings 31. The left hand flange 44 of the separator member 38 is adapted to abut against shoulder 46 in the wider passage 20, and the right hand flange 44 is provided with a slot 48 into which keying element 49 is adapted to be received so that the elongated apertures 42 are brought in line with the second and third inlet ports 28 and 30. As the pressure nut 32 is screwed into the widest passage portion 22 it will, via the sealing rings 31, push the separator 38 up against the shoulder 46, and in so doing will cause the left hand flange 44 on the separator member 38 to engage the apex of the V ring 36 and thus press its ends into firm engagement with the shaft 6 and the interior of the passage portion 20. Further screwing in of the pressure nut 32 will place the sealing rings 31 under axial compression and thus will permit adjustment of the sealing effect around the shaft 6 and the amount of friction exerted on that shaft by the sealing rings 31.

Each of the inlet ports 26, 28 and 30 is provided with an inlet fitting 26a, 28a and 30a respectively, that fitting comprising a casing 50 threadedly received within the corresponding inlet port and carrying a poppet valve the head 54 of which is urged downwardly by spring 56 to seat against downwardly and inwardly inclined surface 58. The top surface 60 of the head 54 is preferably substantially flush with the bottom of the passage portion 18 or 20, as the case may be. The fittings 26a, 28a and 30a are adapted to be connected to suitable sources of appropriate material adapted to be fed thereinto in a controlled manner.

The mixing head 14 comprises a plate portion 62 secured to the left hand end of the elongated body 12, a recess 64 being provided in the outer face thereof into which the agitator disk 66 is received with clearance therearound, that disk being secured to and driven by the shaft 6. The disk 66 may be provided with a plurality of through apertures 67 in order to enhance its agitating effect. A cover plate 68 is provided, held in place on the plate 62 by screws 70, that plate being provided with a circular projection 72 receivable in circular recess 74 in the outer surface of the plate 62, a sealing ring 76 being compressed therebetween. At the upper end of the plate 68 an exit port 78 is provided, within which exit fitting 80 is received, that fitting leading to dispensing nozzle 82. At its lower end the cover plate 68 is provided with a drain port 84 leading to an enlarged internally threaded opening 86, externally threaded drain plug 88 being received therein and sealing ring 90 being compressed between the tip of the plug 88 and the shoulder between the drain port 84 and the opening 86. The plates 62 and 68 may be provided with internal passages 92 through which cooling fluid may be passed via appropriate fittings 94, one of which is shown in the drawings.

From the above description it will be apparent that when material is fed into the mixer A via the ports 26, 28 or 30 that material will flow through the clearance between the shaft 6 and the passage 16 and the clearance between the agitator disk 66 on the one hand and the recess 64 and the cover plate 68 to the exit port 78 on the other hand. Since these clearances are relatively small, on the order of .020–.035 inch, the actual volume of the mixture in the mixer at any other time will be fairly small, perhaps on the order of 15–20 cc. when an agitator disk 66 having a diameter of 5 inches is employed. However, the material will be everywhere in the mixer in a film of relatively small thickness, one surface of the film being in contact with a stationary mixer surface and the other surface of the film being in contact with a moving surface (the shaft 6 or agitator disk 66). Consequently that film will be sheared when the agitator disk 66 is rotated, giving rise to a very effective mixing action. The passages 67 through the agitator disk 66 provided further spaces through which material being mixed can flow and therefore increases the turbulence, and hence the quality of dispersion, of the mixture inside the mixing chamber proper.

When used for the mixing of a reactive resin mixture, one of the mixed components, e.g. the hardener, will enter the mixer through the first inlet port 26, while the other mixed component, e.g. the resin, will enter the mixer through the second inlet port 28. Hence the space to the right of the hardener inlet port 26 up to the sealing rings 31 will be filled with resin, and because the flow of material through the mixer is from right to left as viewed in Fig. 1, no hardener will mix the resin in that space. Consequently only resin will be in contact with the sealing rings 31, and since the resin alone is not reactive the sealing rings 31 will not be adversely affected thereby. The actual reactive mix starts at the first inlet port 26 and extends along the narrow passage portion 18 toward and into the space around the agitator disk 66. The V ring 36 constitutes a safety feature preventing reverse flow (flow to the right) of hardener in the event that the supply of resin should become depleted. As resin is fed through the second inlet port 28 it will move into the wide passage portion 20 and then past the V ring 36 into the narrow portion 18, the V ring 36 being oriented to permit flow in that direction. However, any tendency on the part of the material to the left of the ring 36 to flow toward the port 28 will be resisted by the ring 36, the greater the pressure of the material in tending to move toward the port 28 the more intense the sealing action of the ring 36.

When reactive mix is to be purged from the mixer, as when the system is to be shut down for an appreciable period of time, it is usually preferred that a solvent for both the resin and the hardener be employed as a purging agent. This solvent is adapted to be fed into the mixer through the third inlet port 30. Since all of the reactive mix is between the inlet port 30 and the exit port 78, the solvent or other purging medium will drive the reactive mix ahead of it and will completely rid the mixer thereof. Some resin may remain in the space between the inlet port 30 and the sealing rings 31, but this will not adversely affect the mixer since the resin by itself is not reactive.

When the system is again to be used the solvent must be purged from the mixer. This may be done by feeding resin into the inlet port 28. Since the solvent or other purging medium will all be between the inlet port 28 and the exit port 78, the resin will push the solvent or other purging medium out of the mixer.

After long continued use it is found that non-soluble matter sometimes has a tendency to accumulate at the bottom of the mixing area around the agitator disk 66. It is to permit the drainage of this accumulated matter that the drain port 84 is provided. Since that port may have reactive mix therein, the sealing ring 90 is provided between the mixing chamber and the threaded portion of the drain plug 88. Thus reactive mix cannot reach the threads of the plug 88 and prevent removal thereof.

When, as is here specifically disclosed, the upper surfaces 60 of the poppet valves 54 are substantially flush with the inner surfaces of those portions of the passage 16 into which those valves open, there is little or no possibility that pockets of reactive mixture might accumulate and set.

The fact that the reactive mix is maintained in the form of a thin film which is constantly subjected to a shearing action has two very desirable results. In the first place, because of the existence of the thin film the heat transfer characteristics of the reactive mix are such that its pot life is much greater than would be the case if it were present in bulkier form. In the second place, because of the thixotropic characteristic of the materials employed the subjection of the materials to a high rate of shear will cause a significant reduction in their viscosity. Thus a material which might normally have a viscosity of 300,000 cps. will, when used in a mixer of the present design having an agitator disk 66 with a diameter of 5 inches and rotated at approximately 87 r.p.m., exhibit a decrease in viscosity to less than 100,000 cps.

If through some mischance the reactive mix in the mixer should exceed its pot life and set, disassembly of the mixer for repair and reconditioning is relatively easy and, because the set mixture will be present only in thin films, removal of the parts for cleaning and reconditioning is entirely practical. The cover plate 68 is removed from the plate 62, the shaft 6 is detached from the coupling 4, and the agitator plate 66 and the shaft 6, as a unit, may be pulled out from the body 12. The sealing rings 31 may be removed from the other end of the body 12 after removal of the pressure nut 32. Since no reactive mix has ever been in contact with the sealing rings 31 that removal may be effected without damage to the rings, so that the rings may thereafter be reused. All of the surfaces of the mixer are relatively freely accessible for cleaning and removal of set resin, and all of the set resin is present only in thin film form which it is practical to remove.

While in the specific example here given it is the resin—usually used in larger quantities than the hardener—which enters through the second port 28, there may well be considerations which would impel the open choice as if, for example, the resin were to contain an abrasive filler which would tend to attack the sealing rings 31. Moreover, the mixer design of the present invention would be highly advantageous, even in the absence of reactive characteristics in the mix produced, if one of the substances to be mixed were to be deleterious to the sealing rings 31 or any other "sensitive" portion of the mixer.

While but a single embodiment of the present invention has been here disclosed, it will be apparent that many variations may be made therein, all within the scope of the instant invention as defined in the following claims.

I claim:

1. A mixer comprising a casing with a mixing chamber therein having an outlet end and comprising a passage adjacent its inlet end, an exit port communicating with said chamber adjacent the outlet end thereof, and a pair of inlet ports communicating with said passage and spaced therealong, a first of said inlet ports being closer to said exit port than the second of said inlet ports, and one-way valve means interposed in said passage between said inlet ports, oriented to permit flow toward said first port from said second port and to substantially prevent flow in the opposite direction, said passage having a closed end remote from said exit port, said second of said inlet ports being located substantially at said closed passage end.

2. A mixer comprising a casing with a mixing chamber therein having on outlet end and comprising a passage adjacent its inlet end, an exit port communicating with said chamber adjacent the outlet end thereof, and a pair of inlet ports communicating with said passage and spaced therealong, a first of said inlet ports being closer to said exit port than the second of said inlet ports, and one-way valve means interposed in said passage between said inlet ports, oriented to permit flow toward said first port from said second port and to substantially prevent flow in the opposite direction.

3. A mixer comprising a casing with a mixing chamber therein having an outlet end and comprising a passage adjacent its inlet end, an exit port communicating with said chamber adjacent the outlet end thereof, and a pair of inlet ports communicating with said passage and spaced therealong, a first of said inlet ports being closer to said exit port than the second of said inlet ports, a third inlet port communicating with said passage between said first and second inlet ports, and one-way valve means interposed in said passage between said first and third inlet ports, oriented to permit flow toward said first port from said second and third ports and to substantially prevent flow in the opposite direction.

4. A mixer comprising a casing with a mixing chamber therein having an outlet end and comprising a passage adjacent its inlet end, an exit port communicating with said chamber adjacent the outlet end thereof, and a pair of inlet ports communicating with said passage and spaced therealong, a first of said inlet ports being closer to said exit port than the second of said inlet ports, said inlet ports being provided with check valves permitting flow into said passage but not in the opposite direction, the ends of said check valves being substantially flush with the inner surface of said passage.

5. A mixer comprising a casing having an elongated body and a mixing head on one end of said body, said head having a mixing chamber and said body having a passage therethrough communicating with said chamber, an exit port in said head communicating with said chamber, a rotated member in said chamber connected to a shaft extending through said passage with clearance therearound, sealing means at the end of said passage remote from said chamber, and a pair of inlet ports in said body communicating with said passage and spaced therealong, a first of said ports being closer to said chamber than the second of said ports, and one-way valve means interposed in said passage between said inlet ports, oriented to permit flow toward said first port from said second port and to substantially prevent flow in the opposite direction.

6. A mixer comprising a casing having an elongated body and a mixing head on one end of said body, said head having a mixing chamber and said body having a passage therethrough communicating with said chamber, an exit port in said head communicating with said chamber, a rotated member in said chamber connected to a shaft extending through said passage with clearance therearound, sealing means at the end of said passage remote from said chamber, and a pair of inlet ports in said body communicating with said passage and spaced therealong, a first of said ports being closer to said chamber than the second of said ports, said passage having a portion between said first port and said sealing means which is wider than the passage portion at said first port, a V-shaped sealing ring in said wider passage portion at the end thereof adjacent the narrow passage portion, and a member filling the longitudinal space between said V-ring and sealing means and engaging said sealing means and the apex of said V-ring, the ends of said V-ring engaging said shaft and the inner surface of said wide passage portion respectively, said second inlet port communicating with said wider passage portion.

7. A mixer comprising a casing having an elongated body and a mixing head on one end of said body, said head having a mixing chamber and said body having a passage therethrough communicating with said chamber, an exit port in said head communicating with said chamber, a rotated member in said chamber connected to a shaft extending through said passage with clearance therearound, sealing means at the end of said passage remote from said chamber, and a pair of inlet ports in said body communicating with said passage and spaced therealong, a first of said ports being closer to said chamber than the second of said ports, a third inlet port communicating with said passage between said first and second ports, and one-way valve means interposed in said passage between said first and third inlet ports, oriented to permit flow toward said first port from said second and third ports and to substantially prevent flow in the opposite direction.

8. In combination, a body having a passage therethrough, a member extending through said passage, an elongated space being defined between said member and said body, through which space material is adapted to flow, sealing means at one end of said passage engaging said member and the inner surface of said passage, thereby closing said passage end, said passage having an exit opening remote from said closed passage end, and a pair of ports in said body communicating with said space, a first of said ports being more remote from said closed passage end than the second of said ports, and one-way valve means in said space and located between said first and second ports, oriented to permit flow toward said first port from said second port and to substantially prevent flow in the opposite direction.

9. In combination, a body having a passage therethrough with narrow and wide portions, a member extending through said passage portions with clearance therearound, sealing means in said wide passage portion engaging said member and the inner surface of said wide passage portion, thereby closing the end of said passage at the wide portion thereof, said passage having an exit opening remote from said closed passage end, a first port in said body communicating with said narrow passage portion, and a second port in said body comunicating with said wide passage portion, and one-way valve means between said first and second ports, oriented to permit flow from said second port to said first port and to substantially prevent flow in the opposite direction.

10. In combination a casing having an elongated internal passage, a shaft extending through said passage with clearance therearound, sealing means active between said casing and said shaft at one end of said passage, a pair of inlet ports in said casing communicating with said passage and spaced therealong, a first of said ports being closer to said sealing means than the second of said ports, said passage having a portion between said second port and said sealing means which is wider than the passage portion at said second port, a V-shaped sealing ring in said wider passage portion at the end thereof adjacent the narrower passage portion, and a member extending between said V-ring and said sealing means and engaging said sealing means and the apex of said V-ring, the ends of said V-ring engaging said shaft and the inner surface of said wider passage portion respectively, said first inlet port communicating with said wider passage portion.

11. In the combination of claim 10, means for urging said sealing means toward said narrower passage portion, thereby to urge the ends of said V-ring tightly against said shaft and passage inner surface respectively.

12. The combination of claim 11, in which said member comprises a substantially cylindrical wall spaced from said shaft and the inner surface of said wide passage portion, said wall having an aperture therethrough for the passage of material from said first inlet port.

13. In the mixer of claim 6, means for urging said sealing means toward said narrower passage portion, thereby to urge the ends of said V-ring tightly against said shaft and passage inner surface respectively.

14. The mixer of claim 6, in which said member comprises a substantially cylindrical wall spaced from said shaft and the inner surface of said wide passage portion, said wall having an aperture therethrough for the passage of material from said second inlet port.

15. In the combination of claim 8, a third port in said body communicating with said space and located between said valve means and said second port.

16. In the combination of claim 9, a third port in said body communicating with said wide passage portion on the same side of said valve means as said second port.

References Cited in the file of this patent

UNITED STATES PATENTS

| | | |
|---|---|---|
| 422,385 | Dennedy | Mar. 4, 1890 |
| 2,598,122 | Hansen | May 27, 1952 |
| 2,695,246 | Jurgensen et al. | Nov. 23, 1954 |
| 2,750,959 | Von Seggern | June 19, 1956 |
| 2,795,195 | Amblard et al. | June 11, 1957 |
| 2,847,196 | Franklin et al. | Aug. 12, 1958 |